United States Patent [19]

Tsinberg et al.

[11] Patent Number: 4,908,697

[45] Date of Patent: Mar. 13, 1990

[54] TWO-LINE MAC HIGH DEFINITION TELEVISION SYSTEM

[75] Inventors: Mikhail Tsinberg, Riverdale; Carlo Basile, New York City; Alan P. Cavallerano, Ossining, all of N.Y.

[73] Assignee: North American Philips Corporation, New York, N.Y.

[21] Appl. No.: 77,557

[22] Filed: Jul. 24, 1987

[51] Int. Cl.⁴ .................. H04N 11/02; H04N 7/12
[52] U.S. Cl. ...................... 358/12; 358/133; 358/141
[58] Field of Search .............. 358/12, 14, 133, 135, 358/141

[56] References Cited

U.S. PATENT DOCUMENTS

| | | | |
|---|---|---|---|
| 4,473,837 | 9/1984 | Tiemann | 358/133 |
| 4,476,484 | 10/1984 | Haskell | 358/11 |
| 4,521,803 | 6/1985 | Giltinger | 358/12 |
| 4,533,936 | 8/1985 | Tiemann et al. | 358/12 |
| 4,633,311 | 12/1986 | Gordon et al. | 358/141 |
| 4,652,904 | 3/1987 | Van de Polder | 358/14 |

FOREIGN PATENT DOCUMENTS

| | | | |
|---|---|---|---|
| 51819 | 4/1977 | Japan | 358/12 |
| 225786 | 12/1983 | Japan | 358/12 |
| 219083 | 12/1984 | Japan | 358/133 |
| 226586 | 12/1984 | Japan | 358/12 |
| 157394 | 8/1985 | Japan | 358/14 |
| 158785 | 8/1985 | Japan | 358/12 |

*Primary Examiner*—John W. Shepperd
*Attorney, Agent, or Firm*—Michael E. Marion

[57] ABSTRACT

A high definition television signal with a sequential scan with the standard number of lines per frame and double the frame frequency is processed to generate a single MAC line having a duration substantially equal to that of four sequential lines of standard duration. Each MAC line has two luminance components having different compression ratios. For the remaining two lines, compressed line difference signals are transmitted, thereby allowing reconstruction of all luminance lines at the receiver. Each MAC line further has a U chrominance component and a V chrominance component, alternatively compressed 1:4 and 1:2. The remaining parts of each MAC line are taken up by data signals and audio as well as the necessary clamping. The luminance and chrominance signals are prefiltered to prevent artifacts. The filtering is geared to the visual characteristics of the human visual system, i.e. diagonal spatial frequencies are subjected to more filtering then either purely horizontal or purely vertical spatial frequencies.

23 Claims, 5 Drawing Sheets

2-DIMENSIONAL BANDSTOP FILTER

4:1 VERTICAL DECIMATION – 2-PHASE FRAME RESET (PREFERRED)

4:1 VERTICAL DECIMATION - NO RESET

4:1 VERTICAL DECIMATION - FRAME/2 RESET

TWO-LINE MAC HIGH DEFINITION TELEVISION SYSTEM

CROSS-REFERENCE TO RELATED APPLICATIONS:

(1) U.S. Application Ser. No. 856,622, filed Apr. 5, 1986, issue fee paid June 29, 1987, and incorporated by reference herein.

(2) U.S. Application Ser. No. 931,756, filed Nov. 17, 1986, assigned to the same assignee and incorporated by reference herein.

1. FIELD OF THE INVENTION

The present invention relates to the transmission of high definition television signals and, more specifically, to transmission of high definition television signals in a multiplex analog component (MAC) format.

BACKGROUND OF THE INVENTION

The required bandwidth of a television signal is a function of the spatial (horizontal, vertical) and temporal resolution to be contained in the signal. As increased resolution is desired in either the vertical, horizontal or temporal directions the bandwidth of the signal must be increased. HDTV signals contain considerably more resolution than, for example, NTSC encoded signals. They therefore require significantly more bandwidth than the 9.5 MHz video bandwidth allowed per channel of satellite transmission. It is thus necessary to employ bandwidth reduction techniques in order to reduce the original bandwidth of an HDTV signal for transmission.

In the N.H.K. developed MUSE system, a lower bandwidth is achieved by trading off spatial resolution for temporal resolution. Other systems utilizing spatial-temporal exchange include the system described in the article "HDTV Colorimetry" by W.E. Glenn and K.G. Glenn, High Definition Television 1985 Colloquium Proceedings, and the system proposed in U.S. Application Ser. No. 856,622, filed Apr. 25, 1986 of Mikhail Tsinberg, assigned to the same assignee as the present invention and incorporated by reference herein.

The exact means by which this trade-off is accomplished varies among these systems and is not restricted to only these methods. However all spatial-temporal exchange techniques result in some type of motion artifacts. One example of such artifacts is smear or seemingly further reduced spatial resolution when there is motion in the display.

Studies by B. Wendland, e.g. "High Definition Studies on a Compatible Basis with Present Standards" Television Technology in the 80's, Scarsdale, N.Y., SMPTE, 1981, pp. 151-165 have shown that the two dimensional spatial response of the human visual system is not circular but somewhat diamond shaped. It is therefore concluded that the visual system has more capability to resolve truly horizontal and vertical frequencies rather than diagonal frequencies.

SUMMARY OF THE INVENTION

It is an object of the present invention to devise a system and method for transmitting/receiving or recording/playing back a high definition television signal. It is probable that the video signal will be frequency modulated for transmission over a satellite link. A system is described which exploits the psycho visual characteristic of the human visual system, thereby reducing the bandwidth of the source high definition television signal. That is, the human visual system is less sensitive to diagonal spatial frequencies than purely horizontal or vertical spatial frequencies. Therefore, the high definition signal is subsampled spatially in the diagonal direction, providing a technique of bandwidth reduction.

In accordance with the present invention, packets of luminance and chrominance signals are encoded in a time division multiplexed line format. The unique line format encompasses the duration of four sequential lines. This scheme provides for variant compression ratios and line decimation sequences.

DESCRIPTION OF THE PREFERRED EMBODIMENT

In the embodiment to be described, the high definition television (HDTV) signal to be encoded for transmission has a 525 line 59.94 frame/second sequential scan and a 16:9 aspect ratio. The HDTV bandwidth at the source is wideband RGB, nominally 16.8 MHz for each component, while its line duration is nominally 31.78 $\mu$sec. However, the system and method of the present invention are not to be limited to the processing of such a signal, since both are equally applicable to other high definition television signals which are to be encoded for transmission over a channel having a narrower bandwidth than the bandwidth created by the HDTV source.

For the preferred embodiment to be disclosed herein, the channel is assumed to be a satellite or recording channel having a bandwidth limitation of 9.5 MHz.

For convenience, instead of 59.94, the frame frequency will herein be referred to as 60 frames per second. Finally, it should be noted that the high definition television signal format selected herein is particularly favorable for encoding the received MAC signal into a two channel signal, one channel of which is compatible with the present NTSC standard. (See U.S. Application Ser. No. 856,622, cross-referenced above.)

Figure 1:
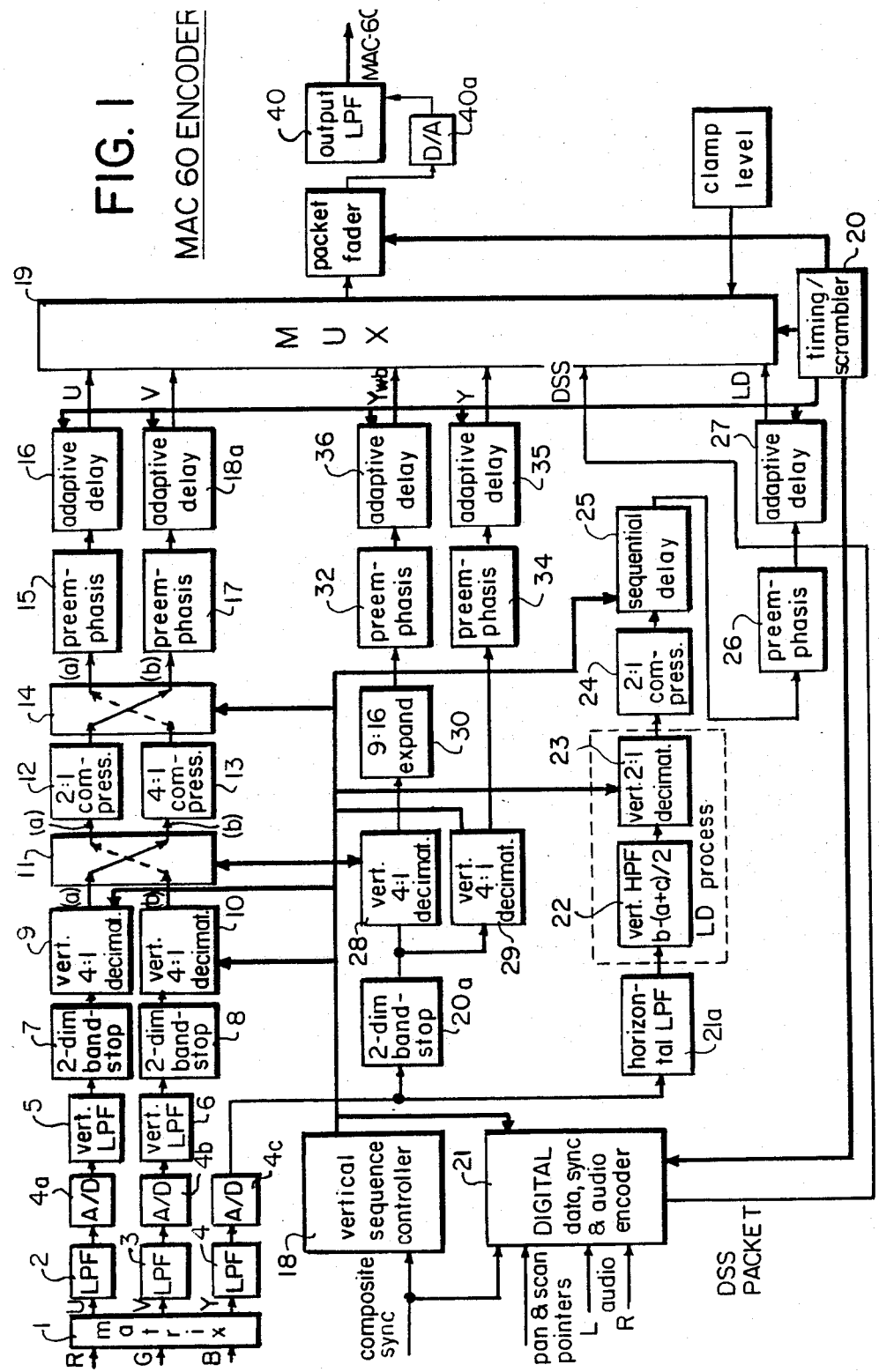
FIG. 1 is a block diagram of the high definition television signal encoder according to the present invention.

Referring now to FIG. 1, the high definition television signal is supplied in the form of R, G, and B signals to a matrix 1. At the output of matrix 1 are the luminance signal Y, and the chrominance signals U, V. Other forms of color difference (chrominance) signals could be used equally well; the U and V signals are illustrative only. It should further be noted that throughout this application the luminance and chrominance signals associated with a particular line of the HDTV signal will have the line designation appended thereto. For example, a luminance signal associated with line 1 of the HDTV signal will be denoted by Y1, etc.

The U, V, and Y signals are low pass filtered in filters 2, 3, and 4, respectively. The color difference signals U, V at the outputs of low pass filters 2 and 3 have bandwidths of 4.75 MHz, while the luminance signal Y at the output of filter 4 has a bandwidth of 16.8 MHz.

The filtered U, V, and Y signals are applied to respective analog/digital converters 4a, 4b, and 4c. The digitized signals are converted back to analog signals either at their respective inputs to multiplexer 19 or after multiplexing, for example in digital to analog converter (D/A) 40a. Although this analog to digital conversion takes place in the preferred embodiment, the system could also be implemented on a completely analog basis.

Taking first the color signals, the outputs of respective analog low pass filters 2 and 3, after A/D conversion in respective A/D converters 4a and 4b, are applied to respective vertical low pass filters 5 and 6. Each of these is, for example, a finite impulse response (FIR) filter, constituted by a delay line having a plurality of taps, adjacent taps being separated by one horizontal line interval delays. The signal at each tap is multiplied by a constant and the so-multiplied tap signals are added together to form the filter output signals. Such filters are well known and will therefore not be described in detail herein. It suffices to say that filters 5 and 6 are each designed to reduce the vertical spectrum above 120 television lines (TVL). These filters, as well as two dimensional bandstop filters 7 and 8, can have coefficients which are not balanced, for example $\frac{1}{8}, \frac{1}{2}, \frac{1}{8}$, resulting in attenuation rather than elimination of certain frequencies as discussed herein.

Figure 2:
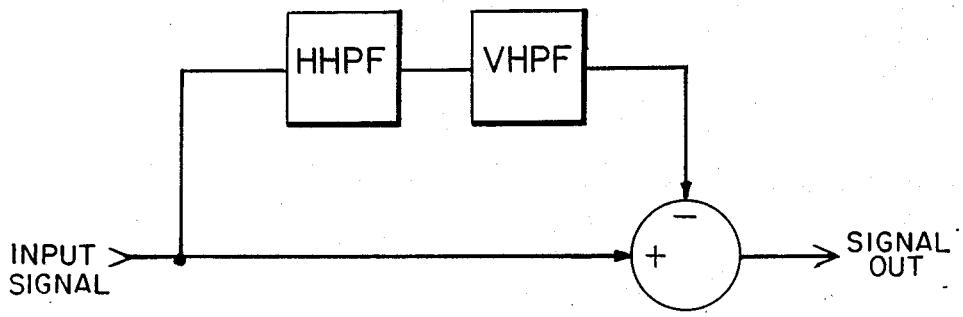
FIG. 2 is a block diagram of a two dimensional bandstop filter.

The outputs of the vertical low pass filters are processed in respective two dimensional bandstop filters 7 and 8. Each two dimensional bandstop is created by cascading a vertical high pass filter with a horizontal high pass filter and subtracting the output signal of the filtered path from the input (See FIG. 2). For the preferred embodiment, the output of the two dimensional bandstop has attenuated diagonal frequencies above 2.375 MHz horizontally and between 60 TVL and 240 TVL vertically.

Figure 3C:
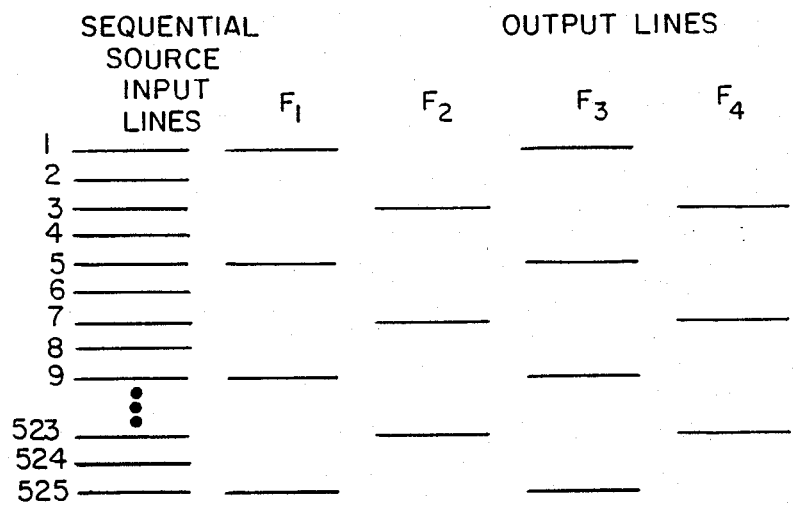
FIGS. 3a, 3b and 3c illustrate three possible sequences for vertical 4:1 decimation of the color difference signals.
Figure 3A:
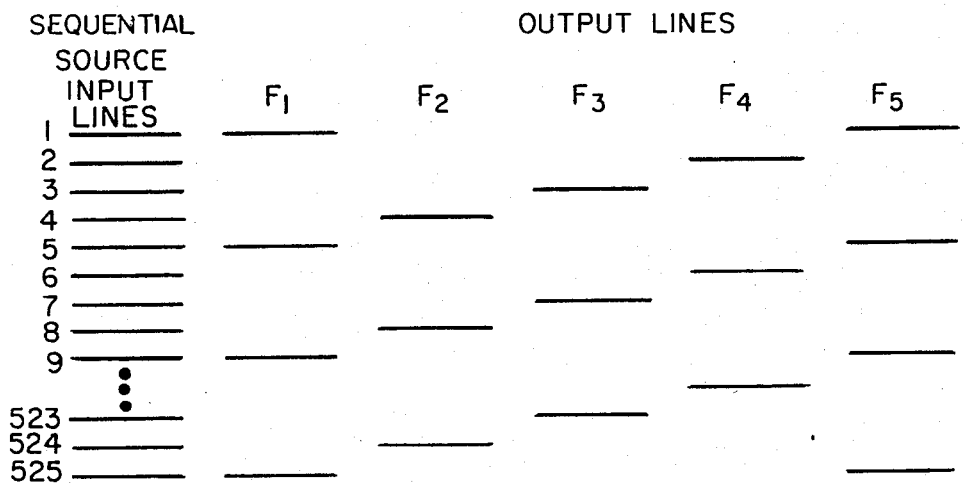
Figure 3B:
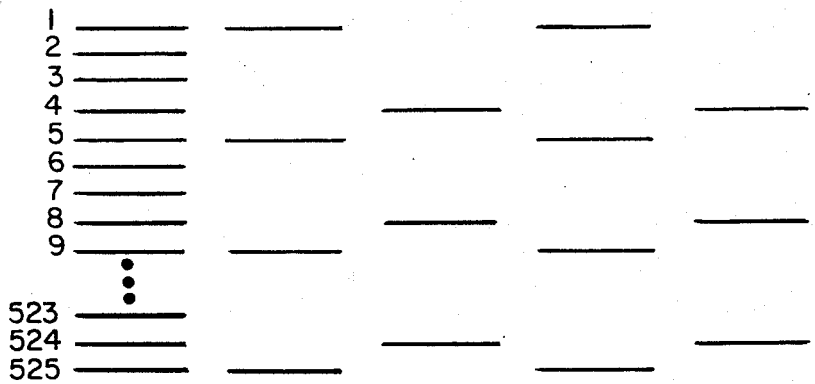

The outputs of two dimensional bandstops 7 and 8 are applied to vertical 4:1 decimators 9 and 10, respectively. Each vertical decimator passes one out of every four lines of the respective U or V signal, under control of a vertical sequence controller 18. For the remaining three lines, the output signal of the respective vertical decimator is set to zero. This results in many possible four frame sequences, some of which are illustrated in FIGS. 3a, 3b, or 3c. All operate under control of a vertical sequence controller 18.

In FIG. 3a, in the first field, F1, a first line, e.g. U1 is transmitted, while U2, U3 and U4 are dropped. The same pattern is continued throughout the first field, U5, U9, etc. being maintained up to the last line, line U525. The pattern continues through the subsequent field, field F2. Here the U component of lines 1, 2 and 3 is dropped, that of line 4 being maintained. This results in the maintaining of U4, U8, etc. down to line U524.

Similarly, the U components of lines 1 and 2 of field F3 are dropped, those of lines 3, 7,...523 being maintained. Finally, in field F4, U1 is dropped, U2 is maintained, U3, U4, and U5 are dropped, while U6 is maintained, etc. The four field sequence repeats with field F5.

The above sequencing could be changed by periodic resetting of a counter in vertical sequence controller 18. The sequence resulting from a reset after two frames, i.e. a f/2 frame reset, is illustrated in FIG. 3b. The sequence for frames F1 and F2 is as described above. It then repeats for frames F3, F4, and all subsequent pairs of frames.

As a last illustration, reference is made to FIG. 3c. There, reset takes place every frame, but, alternately, to different sets of retained lines. During odd frames, U1, U5, etc. are retained; during even frames, U3, U7, U11, etc. This is the preferred embodiment.

The V component is decimated in a similar manner. Preferably, sequences are so chosen that the U and V components of the same line are not retained during the same field.

The vertical sequence controller may have an external switch (not shown) allowing selection of the desired type of sequence at the encoding end. A control signal signifying the selection must then be included in the transmitted signal, e.g. in the vertical interval.

The filtered, decimated U and V components are simultaneously applied to a two position cross-point switch 11 also operating under control of vertical sequence controller 18. The switch alternates position every MAC line, i.e. every four lines of the HDTV signal, as will be discussed below, so that at first U appears at output (a), while V appears at output (b). Thereafter, U appears at output (b) and V appears at output (a). The signal at output (a) is applied to a 2:1 compressor 12 which acts to time-compress the input line by a factor of 2. Therefore an input line of 26 microsecond duration will be compressed to 13 microseconds. Similarly, the signal at output (b) of cross-point switch 11 will be compressed by a ratio of 4:1 in a time compressor 13. Time compressors, as is well known, may be implemented by a storage, read-in taking place at the lower rate, while read-out takes place more rapidly, at a rate designed to effect the proper time compression.

The outputs of time compressors 12 and 13 are applied to a second cross-point switch 14. This switch operates in synchronism with cross-point switch 11 so that the signal U is always present at output 14a, while the signal V is present at output 14b. Due to the alternating sequence, the U components follow a sequence of 2:1 compression on a given MAC line followed by 4:1 compression on the next MAC line. The V components follow the same sequence, but are 180° out of phase with the U sequence.

The signal U is applied to a preemphasis network 15 and an adaptive delay 16. Similarly, the signal V is applied to a preemphasis 17 and an adaptive delay 18. The U and V signals at the outputs of the above-mentioned adaptive delays are applied to a multiplexer 19. Multiplexer 19 operates under control of a timing/scrambler circuit 20. Timing circuit 20 also controls a digital data, sync and audio encoder 21 and other adaptive delay units to be described below. By varying the time slots in which the various signals are transmitted under control of timing circuit 20, the signal can be scrambled. Of course codes signifying the particular scrambling scheme have to be transmitted to the receiver. This can be accomplished, for example, in the vertical retrace intervals. If no scrambling is desired, delays 16, 18a need not be adaptive. They then only serve to equalize the processing delays in the various parallel paths terminating at multiplexer 19.

Turning now to luminance signal processing, the digitized luminance signal Y at the output of low-pass filter 4 is digitized in A/D converter 4c and applied to a two-dimensional bandstop 20a and to a horizontal low-pass filter 21a. Taking the latter path first, filter 21a attenuates horizontal frequencies above 4.75 MHz. The signal at the output of filter 21a is applied to a vertical high-pass filter 22. Filter 22 implements the equation:

$$LD = b - (a + c)/2$$

for each pixel in each line, where b is the value of a pixel in the then-present line, and a and c are the corresponding pixels vertically above and below pixel b, respectively.

The line output signals of vertical high-pass filter 22 are vertically decimated by a 2:1 ratio under control of vertical sequence controller 18. The output signals of the decimator are line differential signals, namely signals which allow reconstruction at the receiver of the dropped luminance signals Y2 and Y4. Line differential signals are discussed in greater detail in the cross-referenced U.S. patent applications. The signal at the output of vertical decimator 23 consists of an active line of line differential signals followed by a blank line, followed by a line of line differential signals, etc. Specifically, in packets of four lines, the first line is dropped, the second line contains line differential signals, the third line is dropped and the fourth line contains line differential signals. The line differential signals are then time compressed by a 2:1 ratio in time compressor 24. The signal at the output of the time compressor 24 is applied to a sequential delay unit 25. Sequential delay 25 operates under control of the vertical sequence controller 18 to reorder the line sequence so that the signal at the output of delay 25 will contain one line of line differential signals, followed by the next line of line differential signals, followed by two blank lines. Sequential delay 25 is preferably constituted by two line storages storing the line differential signals of the second and fourth line, respectively. Under control of the vertical sequence controller 18, the signals from the output of decimator stage 23 are read into these line storages, and subsequently read out.

The line differential signals at the output of sequential delay 25 are applied to a preemphasis stage 26 whose output is, in turn, applied to delay stage 27. The latter, if adaptive, also operates under control of the timing/scrambler unit 20. Finally, the output of delay unit 27, namely the processed line differential signals, are applied to multiplexer 19.

Finally, luminance signal Y at the output of low-pass filter 4 is digitized in A/D converter 4c and applied to a two-dimensional bandstop 20a. The latter is a horizontal high-pass filter cascaded with a vertical high-pass filter (see FIG. 2), the output of the cascaded units being subtracted from the input Y signal, thus creating the two-dimensional bandstop. Coefficients are selected such that diagonal frequencies above 9.5 MHz horizontally and above 240 TVL vertically are attenuated. The output of two dimensional bandstop 20a is applied simultaneously to two vertical decimator stages 28, 29. The control of decimator stages 28 and 29 by vertical sequence controller 18 is such that, for each group of four lines, line Y3 is passed by decimator 28, while Y1 is passed by decimator 29. The decimators are well-known circuits. For example, a preferred decimator is an AND gate having one input receiving the signal to be decimated and another input receiving a timing signal controlling transmission through the gate.

The output of decimator 28, herein also referred to as the wideband luminance signal, $Y_{WB}$, is applied to a 9:16 expanding circuit 30 whose output is, in turn, connected to a preemphasis network 32. The output of vertical decimator 29, luminance signal Y1, is directly applied to the input of a preemphasis stage 34. The outputs of preemphasis stages 32 and 34 are applied to respective adaptive delays 36, 35. Again, the adaptive delays operate under control of timing/scrambler circuit 20. Expanded signal Y3 and signal Y1 are then transmitted through multiplexer 19 under control of timing circuit 20.

Finally, digital data, sync and digital audio signals are applied to the last input of multiplexer 19.

The output of multiplexer 19 consists of one line for every four lines of input signal. Each of the lines therefore takes four times the time of line of input signal, or 127.1 microseconds. The output of multiplexer 19 is low pass filtered in a filter 40 to cut off any frequencies above the allowable channel bandwidth of 9.5 MHz.

Figure 4A:
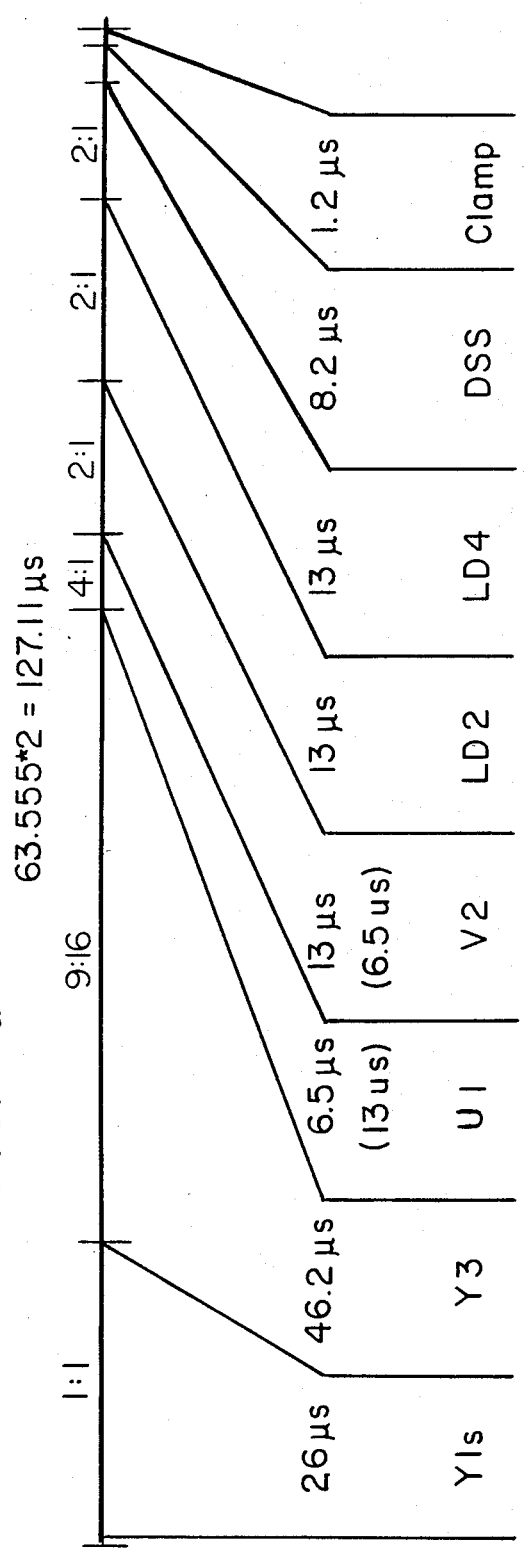
FIG. 4a is a schematic diagram showing one line of a high definition television signal encoded for transmission in accordance with the present invention.

The line structure of one of the multiplexer 19 output lines is illustrated in FIG. 4a. Changes can of course be made in the illustrated structure of the line, not only for different embodiments, but within one embodiment to effect scrambling. In FIG. 4a, the signal component, the time compression to which it has been subjected, the bandwidth to which it can be reconstructed at the receiving end, and the time duration are indicated for each time slot.

Referring now to FIG. 4a, the Y1 component is transmitted in the first 26 microseconds of each line, i.e. with a 1:1 time compression relative to the input HDTV line. The associated bandwidth, 9.5 MHz, is determined by the allowable channel bandwidth, i.e. is the cutoff frequency of filter 40.

Next, the Y3 component, expanded in expansion stage 30 by a 9/16 ratio, is transmitted in a 46.2 microsecond time slot. Since the 16.8 MHz bandwidth was associated with the signal before expansion, after expansion the bandwidth is 9.5 MHz, the widest band accommodated on the transmission channel. At the receiver, Y3 can be reconstructed to 16.8 MHz by compression.

In the next two time slots, the signals U1 and V2 are transmitted. Reference to the encoder diagram, FIG. 1, shows that U and V were filtered to 4.75 MHz in filters 2, 3 respectively. For the illustrated line, the signal U1 is subjected to 4:1 time compression, while V2 is subjected to a 2:1 time compression. The time duration for U1 is therefore 6.5 microseconds, while that of V2 is 13 microseconds. For the next subsequent MAC line, i.e. after the particular four line packet, the time slots of V2 and U1 will reverse, as will the compression ratios. The 4.75 MHz filtered bandwidth for U1 is increased to 16.8 MHz by the 4.1 compression. This will be filtered to 9.5 MHz by output filter 40, therefore allowing reconstruction at the receiver to 2.37 MHz. V2 on the other hand can be reconstructed to 4.74 MHz, since its compression ratio was only 2:1.

In the next time slot, the two line differential signals are transmitted. Specifically, LD2 is transmitted in the first slot, while LD4 is transmitted in the second slot. Both LD signals were filtered to a horizontal limiting frequency of 4.75 MHz and can be reconstructed to that frequency.

The remaining time slots on each line are occupied by digital synchronization signals and digital sound signals. There is also a 0.8 microsecond time slot for a digital clamping signal. The clamping signal is a fixed digital level.

Figure 4C:
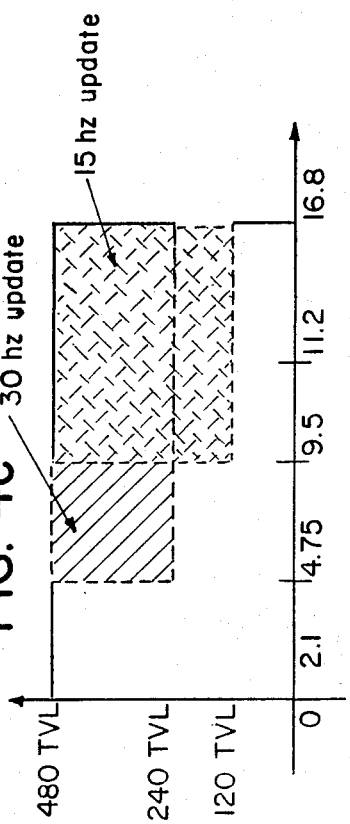
FIG. 4c shows the two dimensional spectra of the luminance signal encoded in accordance with the present invention.
Figure 4B:
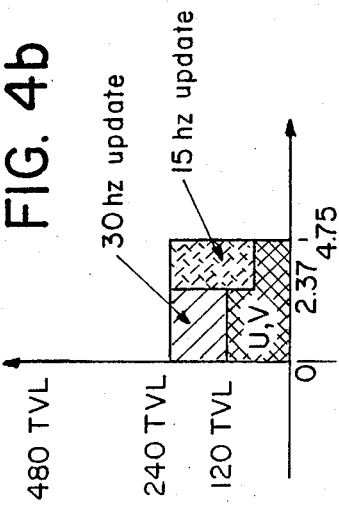
FIG. 4b is a diagram of the two dimensional spectra of the color components of the high definition television signal as encoded.

The two dimensional spectra for the U, V signals are summarized in FIG. 4b, while the luminance and LD signal bandwidths are shown in FIG. 4c.

The horizontal axis is calibrated in MHz while the vertical axis is in TVL.

The following refers to FIG. 4b, based on the decimation pattern of FIG. 3c. It is assumed that the total number of active television lines per sequentially scanned frame is 480 TVL. The color difference signals U, V were vertically low pass filtered in filters 5 and 6 to reduce the vertical spectrum above 120 TVL and in 2 dimensional bandstops 7 and 8 to reduce the diagonal frequencies between 60 and 240 TVL and above 2.375 MHz. In addition, filter 40 cuts half the bandwidth of one of the components during each line. Thus 120 TVL are supported between 0-2.375 MHz, while 60 TVL are supported between 2.375 MHz and 4.75 MHz.

Referring now to FIG. 4c, using signals LD2, LD4, Y1 and Y3 allows reconstruction of all four lines, i.e. 480 TVL, up to 4.75 MHz. The latter limitation is introduced by the filtering of the LD signals. In addition, the region between 0 and 9.5 MHz is supported every other line, i.e. 240 TVL. Finally, one line in four (Y3) has a horizontal bandwidth between 0 and 16.8 MHz. Thus 120 TVL is supported in the region 0-16.8 MHz.

The temporal update rate for the region above 240 TVL vertically and from 4.75 MHz to 9.5 Mhz horizontally for the two-dimensional video spectrum is 30 Hz. This region is supported from the luminance, Y, (Y1 and Y3) components, which are generated to conform to true interlace scanning. The decimation of Y from the original sequential source follows a one line shift for each 60 Hz frame, thereby generating an interlaced field of Y, which extends out to 9.5 MHz horizontally. The resulting interlaced structure of Y results in 240 active source lines to be available at a 60 Hz rate, and all 480 active source lines to be available at a 30 Hz rate. That is the source provides for 480 TVL at 60 Hz, but the lines are decimated vertically 2:1 (generating a Y sequence). Thus, at a 60 Hz rate no more than 240 TVL are available. Because the lines are decimated with a one line shift from source frame to source frame (conforming to interlaced scanning), the region from 240 TVL to 480 TVL is updated at a 30 Hz rate. LD deinterlaces the picture for horizontal frequencies below 4.75 MHz.

The temporal update rate for the region above 120 TVL vertically and from 9.5 MHz to 16.8 MHz horizontally for the two-dimensional video spectrum is dependent upon the decimation sequence selected for Y1 and Y3. Consider the case where there is no frame reset, as shown in FIG. 3a. The wideband Y3 lines, which extend horizontally to 16.8 MHz, are available for 120 of the original 480 TV lines for any decimation sequence. Therefore, the region below 120 TVL vertically is available at a 60 Hz rate, which is the rate of the original source signal. For the region above 120 TVL vertically that is covered by Y3 and not Y1 (that is, from 9.5 Mhz to 16.8 Mhz horizontally), the update rate is 15 Hz for the decimation sequence in FIG. 3a. The Y3 lines conforming to this decimation sequence cover all 480 TVL vertically, but this is true over four original source frames. Thus, the effective temporal update rate for this region is 60 Hz/4, or 15 Hz. That is, all 480 TVL vertically are available to build up the original source image, but they are available over the course of four source frames, for an update rate of 15 Hz.

The above-described lines are transmitted from the encoder to the receiving station, or alternatively, are recorded for later playback.

It should be noted in particular that the line structure and signals transmitted in each frame are the same as those transmitted in all other frames. The only difference may be in the particular lines selected in the 4:1 vertical decimation process.

Figure 5:
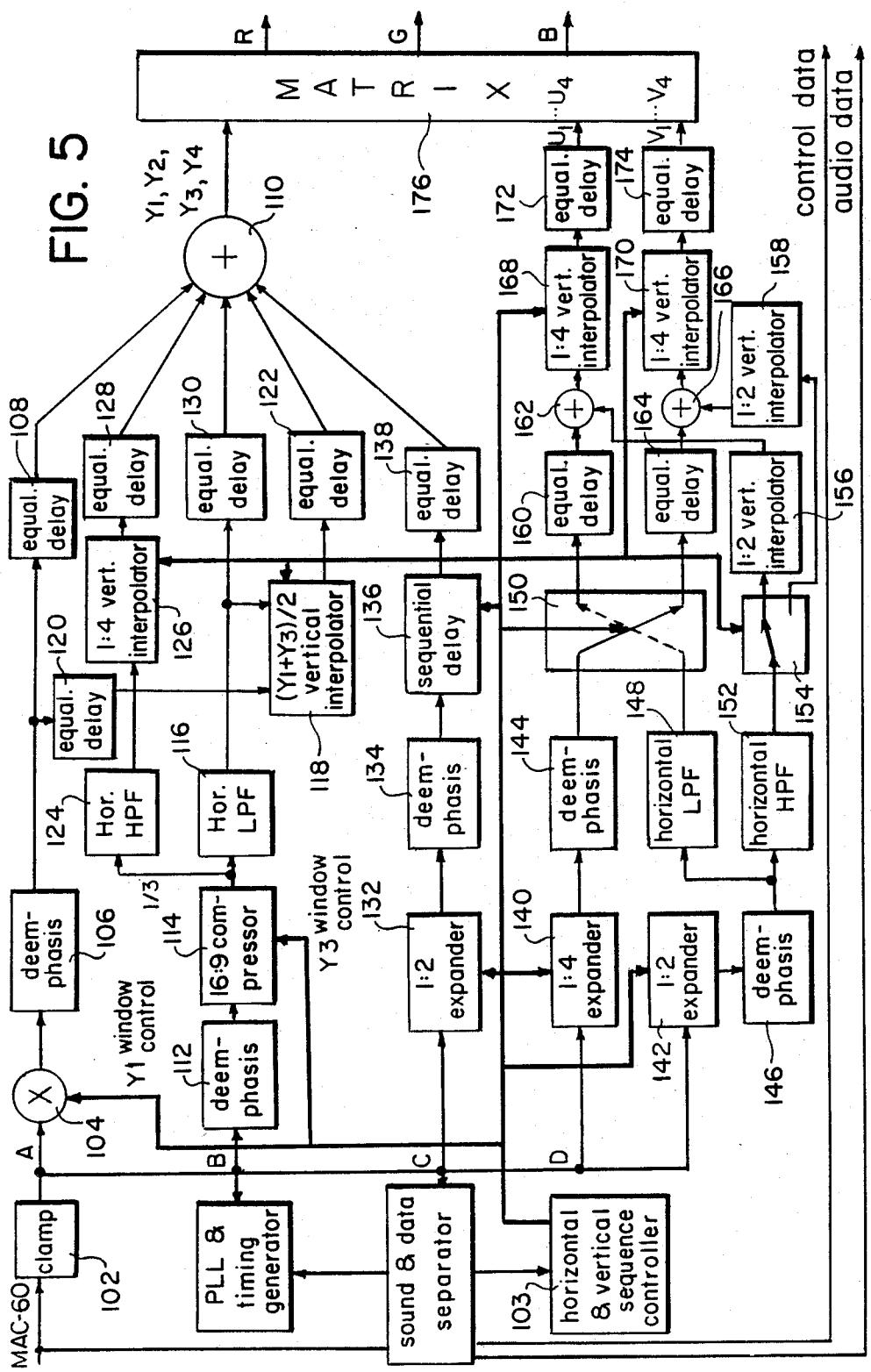
FIG. 5 is a schematic diagram of the high definition television signal decoder according to the present invention.

The decoder will be now described with reference to FIG. 5. In FIG. 5, a clamp circuit 102 provides absolute DC restoration as is normally done in television receivers, and its output is applied to four separate processing paths A through D. All processing is controlled by a horizontal and vertical sequence controller (HVSC) 103.

Each path will now be described individually.

(A) Path A

The signal is applied to a multiplier 104 which in this case is preferably realized as a gate, since the signal will be multiplied either by unity or zero. The multiplying signal is supplied by the HVSC 103 and is equal to one during the time when the video signal contains the Y1 component and equal to zero at all other times. Thus the output of the multiplier 104 contains only the Y1 signal. This is applied to a deemphasis circuit 106 which is a filter that has the inverse characteristic of the preemphasis circuit 35 in the MAC-60 encoder. The de-emphasized Y1 signal is processed in an equalizing delay 108 so that it arrives the appropriate instant relative to other inputs at an adder 110.

(B) Path B

The clamped video signal is applied to a deemphasis circuit 112 which has the inverse characteristic of pre-emphasis circuit 34 used for the Y3 component in the encoder. Its output is applied to a 16:9 compressor 114. The 16:9 compressor 114 also receives a timing signal from HVSC 103 so as to window out all other signals on the line and process only the Y3 component. The output of the 16:9 compressor thus contains only the Y3 component, time compressed to 26 $\mu$sec from the received 46.2 $\mu$sec. This signal is next filtered in a horizontal low-pass filter 116 to attenuate frequencies above 4.75 MHz. The filtered signal is applied to a vertical interpolator 118. The vertical interpolator also receives an input from an equalizing delay 120, i.e. the Y1 signal output from deemphasis circuit 106, appropriately delayed. Vertical interpolator 118 also receives a timing signal input from HVSC 103 and performs the function of taking the average of its two input signals (i.e., (Y1 + Y3)/2). Its output is properly delayed in a further equalizing delay 122.

The output of the 16:9 compressor is also applied to a horizontal high pass filter 124, whose output is applied to an input of a vertical interpolator 126. This vertical interpolator also receives a timing signal from HVSC 103 denoting the time when its video input is active.

It should be noted that, at the encoder, out of four consecutive lines, only the luminance signals of the third line, Y3, were transmitted in expanded form. Since the limiting bandwidth in the final filter of the encoder was 9.5 MHz, the output of horizontal high pass filter 124 extends to 16.8 MHz. However, this extended frequency range is only available in one out of four HDTV lines. The 1:4 interpolator 126 interpolates according to a predetermined formula (e.g. linearly) or, in the simplest case, maintains the output of horizontal high pass filter 124 until the next update is received. This high frequency component, after processing delay time equalization by and equalizing delay 128, is added to the other component of the various luminance signals in adder 110.

The output of the horizontal low pass filter 116 is also sent through an equalizing delay 130 to adder 110.

(C) Path C

The output of clamp 102 is applied to a 1:2 expander 132 which also receives a timing signal input from HVSC 103. The timing signal indicates the presence of the two LD components, LD2 and LD4, on the MAC-60 line so that only these portions of the signal are expanded, all other MAC 60 line components being set to zero. The output is filtered in a deemphasis filter 134 which has the inverse characteristic of the preemphasis filter 36 used to process the LD components in the MAC-60 encoder.

The original LD components (LD2 and LD4) were generated from lines which were not adjacent, but were separated by a one line interval (32 $\mu$sec). It is the function of a sequential delay 136 to delay the LD4 component but not the LD2 component, by 32 $\mu$sec, thus restoring the original separation. Sequential delay 36 may be constituted by a random access memory (RAM) into which LD2 and LD4 are entered. Read-out then takes place with a 32 $\mu$sec delay between the read-out of LD2 and LD4.

The LD2 and LD4 signals are then appropriately delayed in an equalizing delay circuit 138 and applied to adder 110. Adding the LD2 component to the correctly timed output of equalizing delay 30, namely (Y1 + Y3)/2, yields the luminance signal Y2. Similarly, adding LD4 to the output (Y3 + Y1)/2, where Y1 is the luminance component associated with the first line of the next subsequent four line signal packet, yields the reconstruction of luminance signal Y4.

The outputs of adder 110 are thus signals Y1, Y3, Y2 and Y4, i.e. the luminance components associated with the four HDTV input lines which were processed at the encoder to constitute one MAC-60 line.

The decoding of the U and V components will now be discussed with reference to path D.

(D) Path D

The clamped incoming signal is applied to a 1:4 expander 140 and a 1:2 expander 142. Both expanders receive timing signal inputs from HVSC 103. As discussed with reference to FIGS. 1 and 4, the incoming U and V components are alternately compressed by 2:1 and 4:1 ratios. The timing signals applied to the respective expanders window out the 2:1 and 4:1 compressed components, respectively. The outputs of these expanders are sent to deemphasis circuits 144 and 146, respectively. These have the inverse characteristic of preemphasis filters 15 and 17, which processed the U and V components in the MAC-60 encoder.

The output of deemphasis filter 146 is low pass filtered in a filter 148 and sent to a cross-point switch 150 along with the output of deemphasis filter 144. Due to this low-pass filtering, both inputs to the cross-point switch have the same bandwidth. Before low pass filtering, the signal at the output of deemphasis filter 146 had twice the bandwidth of the signal at the output of deemphasis filter 144.

In order to recover the high frequency information carried in the 2:1 compressed component, the output of deemphasis network 146 is horizontally high pass filtered in a filter 152. The output of horizontal high pass filter 152 is high frequency information which alternates MAC line by MAC line between the U and V components. A switch 154 operating under control of the horizontal and vertical sequence controller 103 switches the output of horizontal high pass filter 152 alternately on a MAC line by MAC line basis to a 1:2 vertical interpolator 156 and a second 1:2 vertical interpolator 158. Again, the interpolators can operate in accordance with any desired interpolation scheme. In the simplest case, each interpolator is a storage in which information is maintained until new information is received. The outputs of interpolators 156 and 158 are then each maintained for two scanning line intervals.

If it is assumed that the U1 components are furnished at the upper output of switches 154 and 150, while the V2 components are furnished at the lower outputs, then U1, after passing through an equalizing delay 160, is applied to one input of a summing circuit 162, the other input of summing circuit 162 being connected to the output of interpolator 156. Similarly, the V2 output at the lower output of switch 150 is applied to an equalizing delay 164. The delayed V2 component is then applied to one input of an adder 166, the other input of adder 166 receiving the output of interpolator 158.

The output of adder 162, for example U, is applied to a 1:4 interpolator 168. At the output of interpolator 168, four U signals, one for each line of the group of four lines constituting the MAC line are furnished. Similarly, the output of adder 166 is applied to a 1:4 vertical interpolator 170. At the output of interpolator 170, four V signals, again one for each scanning line constituting the MAC line, will be found. The signals at the outputs of interpolators 168 and 170 are, respectively, applied to equalizing delays 172 and 174. The outputs of the equalizing delays are applied to inputs of a matrix 176. Matrix 176 also receives the outputs of adder 110, namely the luminance signals for lines corresponding to the lines for which the chrominance signals are furnished. The output of matrix 176 are RGB signals with a 525 line, 60 frames per second, 1:1 (sequential) scan and a 16:9 aspect ratio. This RGB output can therefore be displayed on a monitor which accepts this scanning format.

Although the present invention has been described in a specific embodiment, it is not to be limited thereto. Many variations will occur to one skilled in the art and these are intended to be encompassed in the following claims.

What is claimed is:

1. Method of encoding a high definition television signal having a predetermined number of frames per second, each frame having a plurality of HDTV lines each having a first line period, each HDTV line comprising a luminance component having a predetermined luminance bandwidth and at least one chrominance component, for transmission or recording with a channel bandwidth less than said luminance bandwidth, comprising the steps of:

processing said plurality of HDTV lines in groups, each group containing information from a multiplicity of sequential HDTV lines, to generate a plurality of signal packets, said signal packets comprising a first luminance component from a first HDTV line having a first time compression ratio, a second luminance component from a second HDTV line having a second time compression ratio, the second time compression ratio being different from said first time compression ratio, a plurality of line difference components and at least one chrominance component separate from said luminance components; and generating a time multiplexed line signal having a second line period greater than said first line period by time multiplexing said signal packets in time slots thereof.

2. A method as set forth in claim 1, wherein said plurality of HDTV lines comprises m sequentially traced lines per frame; and wherein said group of HDTV lines comprises four of said HDTV lines.

3. A method as set forth in claim 1, wherein each of said groups comprises a first, second, third and fourth sequentially scanned one of said HDTV lines.

4. A method as set forth in claim 1, wherein said first luminance component is a time-expanded luminance component such that for at least one HDTV line in each group all information contained in said luminance component having a predetermined luminance bandwidth greater than said channel bandwidth is contained in said first luminance component signal packet.

5. A method as set forth in claim 4, wherein said at least one chrominance component comprises a first chrominance component and a second chrominance component; and wherein said processing step further comprises time compressing said first chrominance component by a first predetermined ratio and said second chrominance component by a second predetermined ratio different from said first predetermined ratio, thereby creating a compressed first chrominance component signal and a compressed second chrominance component signal, and inserting said first and second compressed chrominance component signals into, respectively, first and second chrominance component time slots of said time multiplexed line signal.

6. A method as set forth in claim 1, wherein at least one of said line difference components is implemented according to the equation LD = b − (a + c)/2 where b is a value of a pixel at a particular line of a particular group, and a and c are corresponding pixels vertically above and below pixel b respectively.

7. A method as set forth in claim 6, wherein said first luminance component is expanded at a compression ratio of substantially of nine to sixteen, said compression ratio of said second luminance component is one to one, and the compression ratio of at least one of said line difference components is two to one.

8. Apparatus as set forth in claim 1, wherein at least one of said line difference components is implemented according to the equation LD = b − (a + c)/2 where b is a value of a pixel at a particular line of a particular group, and a and c are corresponding pixels vertically above and below pixel b respectively.

9. Apparatus as set forth in claim 8, wherein said first luminance component has a compression ratio of about nine to sixteen resulting in the expansion of said first luminance component, said compression ratio of said second luminance component is about one to one, and the compression ratio of at least one of said line difference components is about two to one.

10. A method according to claim 1, further comprising the step of receiving or regenerating said time multiplexed line signal;

demultiplexing said time multiplexed line signal to generate individual signal packets;

regenerating said first luminance component, second luminance component and at least one chrominance component from said signal packets; and regenerating said high definition television signal therefrom.

11. A method as set forth in claim 1, wherein each of said groups comprises four sequential HDTV lines;

wherein said first time compression ratio of said first luminance component is a time expansion ratio having a magnitude sufficient for allowing reconstruction of said predetermined luminance bandwidth at a receiving end.

12. A method as set forth in claim 1, wherein said time multiplexed line signal has a bandwidth less than said channel bandwidth;

further comprising the steps of transmitting or recording said time multiplexed line signal; and upon reception or playback;

demultiplexing said time multiplexed line signal to generate said plurality of signal packets; and processing and combining said signal packets to reconstitute said high-definition television signal.

13. The method of claim 1 further comprising the steps of processing an audio signal into a further signal packet and time multiplexing said signal packets with said further signal packet.

14. Apparatus for encoding a high definition television signal having a predetermined number of frames per second, each frame having a plurality of HDTV lines each having a first line period, each HDTV line comprising a luminance component having a predetermined luminance bandwidth and at least one chrominance component, for transmission or recording with a channel bandwidth less than said luminance bandwidth, comprising:

means for processing said plurality of HDTV lines in groups, each group containing information from a multiplicity of sequential HDTV lines, to generate a plurality of signal packets, said signal packets comprising a first luminance component from a first HDTV line having a first time compression ratio a second luminance component from a second HDTV line having a second time compression ratio, the second time compression ratio being different from said first time compression ratio, a plurality of line difference components and at least one chrominance component separate from said luminance components; and means coupled to said processing means for generating a time multiplexed line signal having a second line period greater than said first line period by time multiplexing said signal packets in time slots thereof.

15. Apparatus as set forth in claim 14, wherein said plurality of HDTV lines comprises m sequentially traced lines per frame; and wherein said group of HDTV lines comprises four of said HDTV lines.

16. Apparatus according to claim 14, further comprising receiving means for receiving said time multiplexed line signal, thereby creating a received time multiplexed signal;
  means for demultiplexing said received time multiplexed signal to generate said signal packets;
  means coupled to said demultiplexing means for processing said signal packets to generate said first luminance component, said second luminance component and said at least one chrominance component; and
  means coupled to said processing means for reconstituting said high definition television signal from at least said first luminance component, said second luminance component and said at least one chrominance component.

17. Apparatus as set forth in claim 14, further comprising means for transmitting or recording said time multiplexed line signal;
  means for receiving or playing back said time multiplexed line signal;
  means connected to said receiving or playback means for demultiplexing said time multiplexed line signal, thereby generating said plurality of signal packets; and
  processing and combining means connected to said demultiplexing means for processing and combining said signal packets to reconstitute said high definition television signal.

18. Apparatus according to claim 14 which further comprises:
  input means for inputting an audio signal;
  said processing means further comprises means for processing said audio signal into a further signal packet; and
  means for time multiplexing said signal packets with said further signal packet.

19. Apparatus for decoding a line signal received over a channel having a channel bandwidth and comprising a plurality of time multiplexed signal packets comprising at least first and second luminance components having first and second time compression ratios, a plurality of line difference components and at least one chrominance component, said apparatus comprising
  means for demultiplexing said line signal to separate said signal packets;
  means coupled to said demultiplexing means, for processing said sequential HDTV lines, at least one of said sequential HDTV lines in each group having a predetermined luminance signal bandwidth greater than said channel bandwidth; and
  means for processing said signal packets to provide an HDTV display.

20. Apparatus according to claim 19 for decoding said line signal in which said first luminance component is a time-expanded luminance component;
  wherein said processing means comprises means for time compressing said time-expanded luminance component to provide said luminance signal having said predetermined luminance signal bandwidth.

21. Apparatus according to claim 20 for decoding a line signal in which said signal packets further comprise first and second line difference components;
  wherein said processing means comprises means for separating said line difference components.

22. Apparatus according to claim 21 for decoding a line signal in which said signal packets further comprise at least one audio component;
  wherein said processing means comprises means for providing at least two color signals; and
  further comprises means for processing said audio component to provide audio signals.

23. Apparatus according to claim 22 for decoding a line signal which comprises, a first chrominance component having a first time compression ratio for a first group of HDTV lines and a second time compression ratio for a second group of HDTV lines, and a second chrominance component having said second time compression ratio for said first group and said first time compression ratio for said second group;
  wherein said processing means further comprises first and second chrominance expansion means and a switch means for switching between said first and second chrominance expansion means.

* * * * *